United States Patent
Maeda

(10) Patent No.: US 8,267,522 B2
(45) Date of Patent: Sep. 18, 2012

(54) OPTICAL ELEMENT, ILLUMINATION APPARATUS, AND PROJECTION DISPLAY APPARATUS

(75) Inventor: Makoto Maeda, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 286 days.

(21) Appl. No.: 12/727,280

(22) Filed: Mar. 19, 2010

(65) Prior Publication Data

US 2010/0238410 A1 Sep. 23, 2010

(30) Foreign Application Priority Data

Mar. 23, 2009 (JP) ................... 2009-070654

(51) Int. Cl.
  G03B 21/14 (2006.01)
(52) U.S. Cl. ............................. 353/20; 353/7
(58) Field of Classification Search ............... 353/7, 20; 359/502, 485
  See application file for complete search history.

(56) References Cited

U.S. PATENT DOCUMENTS

2006/0146292 A1* 7/2006 Lin ................................ 353/33
2009/0002636 A1* 1/2009 Yamamoto ..................... 353/20

FOREIGN PATENT DOCUMENTS

JP 2001-083636 A 3/2001

* cited by examiner

Primary Examiner — Que T Le
Assistant Examiner — Jerry Brooks
(74) Attorney, Agent, or Firm — Marvin A. Motsenbocker; MOTS Law, PLLC

(57) ABSTRACT

An optical element includes a mirror surface configured to transmit certain part of incident light and to reflect the other part of the incident light. The mirror surface has a first region and a second region. The first region includes a first polarization conversion layer configured to convert a polarization direction of incident light incident on the first region from one linear polarization into a different linear polarization. A region of the optical element from which light transmitted through the first region is emitted includes a second polarization conversion layer configured to convert a polarization direction of the light transmitted through the first region from the different linear polarization into the one linear polarization.

6 Claims, 6 Drawing Sheets

OPTICAL ELEMENT, ILLUMINATION APPARATUS, AND PROJECTION DISPLAY APPARATUS

CROSS REFERENCE TO RELATED APPLICATIONS

This application is based upon and claims the benefit of priority from prior Japanese Patent Application No. 2009-070654, filed on Mar. 23, 2009; the entire contents of which are incorporated herein by reference.

BACKGROUND OF THE INVENTION

1. Field of the Invention

The present invention relates to an optical element having a mirror surface configured to transmit certain part of incident light and to reflect the other part of the incident light, and also relates to an illumination apparatus and a projection display apparatus using this optical element.

2. Description of the Related Art

Heretofore, there has been known an optical element (a dichroic mirror) having a mirror surface configured to transmit certain part of incident light and to reflect the other part of the incident light. For example, such a dichroic mirror is used as a color separation element for separating color component light. Specifically, the dichroic mirror is used in a projection display apparatus in order to separate light emitted from a lamp light source into color component light beams of multiple colors.

For an apparatus in which such a dichroic mirror is employed, a target cutoff wavelength is defined which is the boundary wavelength between the wavelength band of desired transmitted light and the wavelength band of desired reflected light. Here, the cutoff wavelength of the dichroic mirror is shifted in accordance with the incident angle of light incident on the mirror surface. Specifically, as FIG. 1 shows, the cutoff wavelength is shifted to a longer wavelength side, i.e., from a position indicated with a solid line to a position indicated with a dotted line when the incident angle becomes smaller ($\theta s-\alpha$). On the other hand, the cutoff wavelength is shifted to a shorter wavelength side, i.e., from the position indicated with the solid line to a position indicated with a dashed line when the incident angle becomes larger ($\theta s+\alpha$). Here, a position where a cutoff wavelength reference value that separates transmission and reflection of light having a reference incident angle $\theta s$ (e.g., 45°) becomes equal to the target cutoff wavelength will be referred to as a reference position.

As described above, the cutoff wavelength is shifted according to the incident angle. This causes variation in the cutoff wavelength on the entire mirror surface with respect to the target cutoff wavelength. Thus, there has been proposed a technique in which the cutoff wavelength reference value varies gradiently according to the distance from the reference position on the mirror surface. Specifically, the cutoff wavelength reference value is set to a longer wavelength side than the target cutoff wavelength for a region where the incident angle is greater than that at the reference position, i.e., for a region where the distance of the optical path of the light emitted from the lamp light source to the region is longer than that to the reference position. On the other hand, the cutoff wavelength reference value is set to a shorter wavelength side than the target cutoff wavelength for a region where the incident angle is smaller than that at the reference position, i.e., for a region where the distance of the optical path of the light emitted from the lamp light source to the region is shorter than that to the reference position.

Incidentally, a pair of fly-eye lenses having multiple microlenses (cells) has been known as an optical element for equalizing the distribution of the amounts of light beams, emitted from the lamp light source, on a light valve (a liquid crystal panel or the like). Specifically, the light emitted from each of the cells provided in the pair of fly-eye lenses is irradiated on the entire surface of the light valve.

In an optical system including the lamp light source, the pair of fly-eye lenses, and the dichroic mirror, the pair of fly-eye lenses is disposed between the lamp light source and the dichroic mirror. That is, the mirror surface of the dichroic mirror is irradiated with the light emitted from each of the cells provided in the pair of fly-eye lenses.

Generally, in the above-described dichroic mirror, the cutoff wavelength reference value varies monotonously in proportion to the distance from the reference position on the mirror surface.

The dichroic mirror in which the cutoff wavelength reference value varies monotonously can improve, to some extent, the color purity of the color component light beams (the transmitted light and the reflected light) separated by the dichroic mirror. Nonetheless, there is an expectation for further improvement in the color purity of the transmitted light and the reflected light.

SUMMARY OF THE INVENTION

An optical element (dichroic mirror 30, for example) of first aspect includes a mirror surface (mirror surface 31) configured to transmit certain part of incident light and to reflect the other part of the incident light. The mirror surface has a first region (region 31a) and a second region (region 31b). The first region includes a first polarization conversion layer ($\lambda/2$ wavelength film 32) configured to convert a polarization direction of incident light incident on the first region from one linear polarization (S-polarization, for example) into a different linear polarization (P-polarization, for example). A region of the optical element from which light transmitted through the first region is emitted includes a second polarization conversion layer ($\lambda/2$ wavelength film 33) configured to convert a polarization direction of the light transmitted through the first region from the different linear polarization into the one linear polarization.

According to the first aspect, the light incident on the first region is converted into from the one linear polarization into the different linear polarization. Therefore, a cutoff wavelength of the first region shifts to a shorter wavelength side or a longer wavelength side. Since the light reflected by the first region transmitted through the first polarization conversion layer again, the light reflected by the first region is converted from the different linear polarization into the one linear polarization. Since the light transmitted through the first region transmitted through the second polarization conversion layer, the light transmitted through the first region converted from the different linear polarization into the one linear polarization.

Accordingly, even if the light having various incident angles incident on the mirror surface, a dispersion of the cutoff wavelength may be reduced as the entire mirror surface, a purity of separated color component light may be improved.

An illumination apparatus (illumination apparatus 90) of second aspect includes a light source (lamp light source 10); a fly-eye lens (fly-eye lens 20) configured to overlap light beams from the light source and to irradiate irradiation objects with the light beams; a polarization conversion element (PBS array 21) configured to convert a polarization direction of each of the light beams from the light source into one linear polarization (S-polarization, for example); and an optical element (dichroic mirror 30, for example) having a mirror surface (mirror surface 31) configured to transmit certain part of incident light and to reflect the other part of the incident light. The mirror surface has a first region (region 31a) and a second region (region 31b). The first region includes a first polarization conversion layer (λ/2 wavelength film 32) configured to convert a polarization direction of incident light incident on the first region from one linear polarization (S-polarization, for example) into a different linear polarization (P-polarization, for example). A region of the optical element from which light transmitted through the first region is emitted includes a second polarization conversion layer (λ/2 wavelength film 33) configured to convert a polarization direction of the light transmitted through the first region from the different linear polarization into the one linear polarization.

According to the second aspect, even if the light having various incident angles incident on the mirror surface, a dispersion of the cutoff wavelength may be reduced as the entire mirror surface, a purity of separated color component light may be improved.

A projection display apparatus (projection display apparatus 100) of third aspect includes a light source (lamp light source 10); a fly-eye lens (fly-eye lens 20) configured to overlap light beams from the light source; a polarization conversion element (PBS array 21) configured to convert a polarization direction of each of the light beams from the light source into one linear polarization (S-polarization, for example); and an optical element (dichroic mirror 30, for example) having a mirror surface (mirror surface 31) configured to transmit certain part of the light beams whose polarization directions are converted into the one linear polarization and to reflect the other part of the light beams so as to guide the certain part and the other part of the light beams to a plurality of light valves (liquid crystal panel 50), respectively. The mirror surface has a first region (region 31a) and a second region (region 31b). The first region includes a first polarization conversion layer (λ/2 wavelength film 32) configured to convert a polarization direction of incident light incident on the first region from one linear polarization (S-polarization, for example) into a different linear polarization (P-polarization, for example). A region of the optical element from which light transmitted through the first region is emitted includes a second polarization conversion layer (λ/2 wavelength film 33) configured to convert a polarization direction of the light transmitted through the first region from the different linear polarization into the one linear polarization.

Alternately, a projection display apparatus (projection display apparatus 100) of third aspect includes a light source (lamp light source 10); a fly-eye lens (fly-eye lens 20) configured to overlap light beams from the light source; a polarization conversion element (PBS array 21) configured to convert a polarization direction of each of the light beams from the light source into one linear polarization (S-polarization, for example); light valves (liquid crystal panels 50) each configured to modulate the light beams whose polarization directions are converted into the one linear polarization; a first optical element (dichroic mirror 30) configured to separate light from the light source into first color component light (blue component light B) and other color component light (red component light R and green component light G) and to guide the first color component light to a first light valve (liquid crystal panels 50B); and a second optical element (dichroic mirror 35) configured to separate the other color component light into second color component (green component light G) light and third color component light (red component light R), to guide the second color component light to a second light valve (liquid crystal panels 50G), and to guide the third color component light to a third light valve (liquid crystal panels 50G). A mirror surface of the first optical element has a first region (region 31a) and a second region (region 31b). The first region includes a first polarization conversion layer (λ/2 wavelength film 32) configured to convert a polarization direction of incident light incident on the first region from one linear polarization (S-polarization, for example) into a different linear polarization (P-polarization, for example). A region of the optical element from which light transmitted through the first region is emitted includes a second polarization conversion layer (λ/2 wavelength film 33) configured to convert a polarization direction of the light transmitted through the first region from the different linear polarization into the one linear polarization.

According to the third aspect, even if the light having various incident angles incident on the mirror surface, a dispersion of the cutoff wavelength may be reduced as the entire mirror surface, a purity of separated color component light may be improved.

In the third aspect, the light source includes a plurality of lamp light sources.

DETAILED DESCRIPTION OF THE EMBODIMENTS

Figure 1:
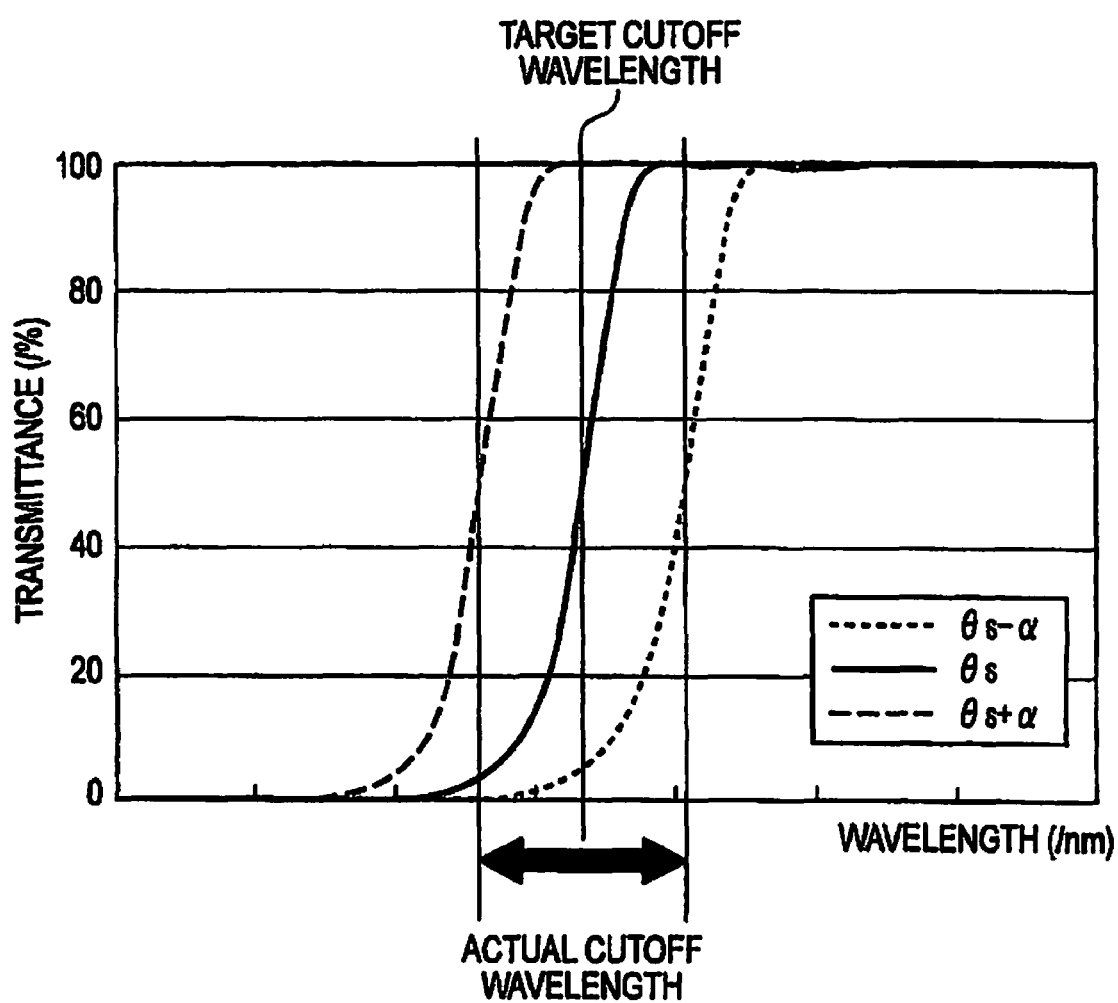
FIG. 1 is a graph for explaining an influence of an incident angle on a cutoff wavelength in a conventional technique.

With reference to the drawings, a projection display apparatus according to an embodiment of the present invention will be described below. Throughout the drawings, the same or like parts bear the same or like reference numerals.

It should be noted, however, that the drawings are schematic, and that the dimensional proportions and the like are different from their actual values. Accordingly, specific dimensions and the like should be inferred based on the description given below. Moreover, dimensional relationships and proportions may differ from one drawing to another in some parts, of course.

(Configuration of Projection Display Apparatus)

Figure 2:
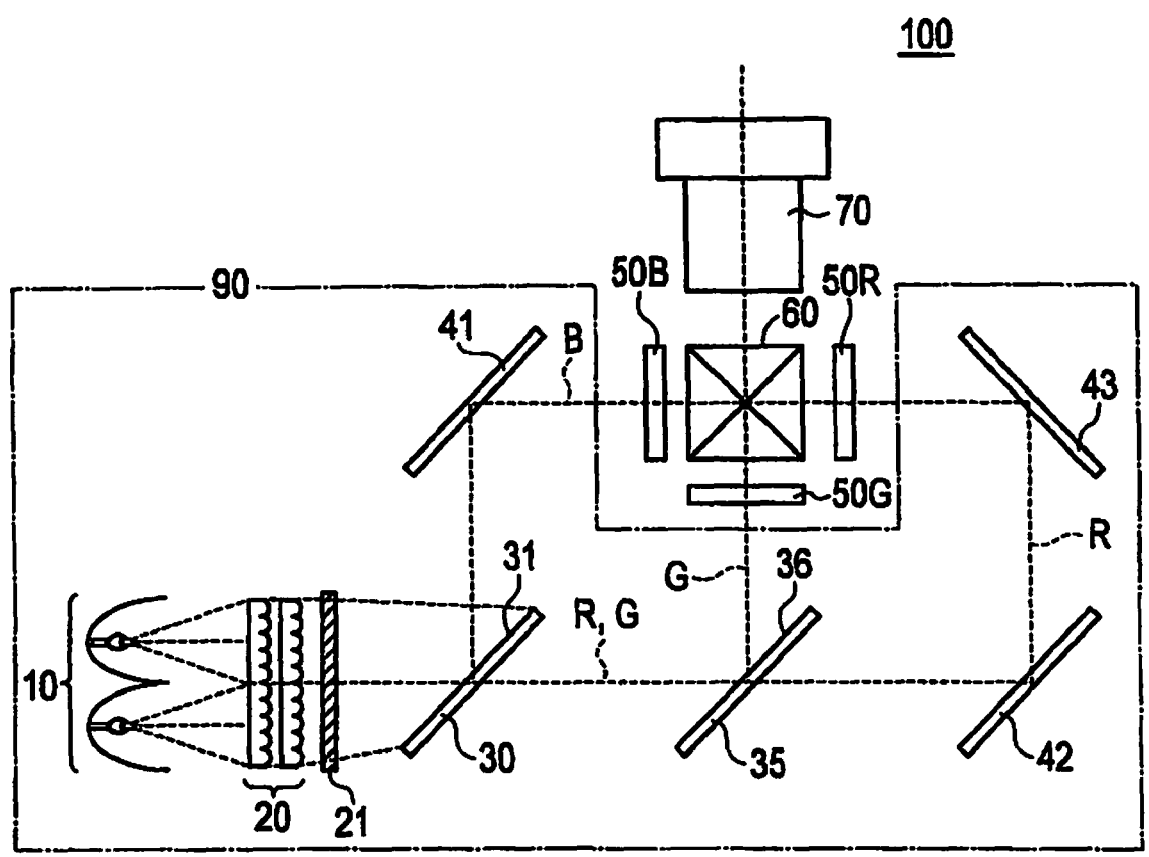
FIG. 2 is a view showing a configuration of a projection display apparatus according to an embodiment of the present invention.

A configuration of a projection display apparatus according to an embodiment of the present invention will be described below with reference to the drawings. FIG. 2 is a view showing a projection display apparatus 100 according to the embodiment. It is to be noted that a condenser lens, a relay lens, and so forth are omitted in FIG. 2.

As FIG. 2 shows, the projection display apparatus 100 includes lamp light sources 10, a fly-eye lens unit 20, a PBS array 21, a group of multiple mirrors, multiple liquid crystal panels 50, a dichroic prism 60, and a projection lens unit 70. It is to be noted that FIG. 2 only shows the configuration which is necessary for explaining the embodiment. Accordingly, polarizing plates provided on the liquid crystal panels 50 and other components are omitted in FIG. 2.

The lamp light sources 10 are typically UHP lamps configured to emit white light. In the embodiment, the lamp light sources 10 include two UHP lamps. That is, the projection display apparatus 100 is a multi-light display device including the multiple lamps.

The fly-eye lens unit 20 is an optical element configured to equalize the illuminance distribution of the light on the liquid crystal panels 50, the light being emitted from the lamp light sources 10. Specifically, the fly-eye lens unit 20 includes a pair of fly-eye lenses and each of the fly-eye lenses includes a group of multiple microlenses.

The PBS array 21 is an optical element configured to align the polarization direction of the light emitted from each of the lamp light sources 10. Specifically, the PBS array 21 is formed by arraying multiple members each formed of: a polarization beam splitter configured to reflect s-polarized light and to transmit p-polarized light; and a λ/2 wavelength plate configured to convert the p-polarized light which is transmitted through the polarization beam splitter into the s-polarized light.

The group of multiple mirrors includes a dichroic mirror 30, a dichroic mirror 35, and reflection mirrors 41 to 43.

The dichroic mirror 30 is an optical element having a mirror surface 31 configured to transmit certain part of incident light (light beams emitted from respective cells provided in the fly-eye lens unit 20 in this case) and to reflect the other part of the incident light. For the dichroic mirror 30, a target cutoff wavelength is defined which is the boundary wavelength between the wavelength band of desired transmitted light and the wavelength band of desired reflected light.

Specifically, the dichroic mirror 30 transmits red component light R and green component light G and reflects blue component light B. That is, the desired transmitted light corresponds to the red component light R and the green component light G while the desired reflected light corresponds to the blue component light B. Therefore, the target cutoff wavelength corresponds to the boundary wavelength between the wavelength band of the green component light G and the wavelength band of the blue component light B.

The dichroic mirror 30 (the mirror surface 31) has an inclination relative to the optical axis of the light emitted from each lamp light source 10. Specifically, the dichroic mirror 30 (the mirror surface 31) has an inclination of almost 45° relative to the optical axis of the light emitted from each lamp light source 10.

In the first embodiment, the blue component light B is separated from the light emitted from the lamp light sources 10 earlier than the red component light R and the green component light G are. However, the present invention is not limited to such a case. For example, it is also possible to separate the red component light R from the light emitted from the lamp light sources 10 earlier than the green component light G and the blue component light B are.

The dichroic mirror 35 is an optical element having a mirror surface 36 configured to transmit certain part of incident light (light transmitted through the dichroic mirror 30 in this case) and reflect the other part of the incident light. For the dichroic mirror 35, a target cutoff wavelength is defined which is the boundary wavelength between the wavelength band of desired transmitted light and the wavelength band of desired reflected light.

Specifically, the dichroic mirror 35 allows the red component light R and reflects the green component light G. That is, the desired transmitted light corresponds to the red component light R while the desired reflected light corresponds to the green component light G. Therefore, the target cutoff wavelength corresponds to the boundary wavelength between the wavelength band of the red component light R and the wavelength band of the green component light G.

The dichroic mirror 35 has an inclination relative to the optical axis of the light emitted from each lamp light source 10. Specifically, the dichroic mirror 35 has an inclination of almost 45° relative to the optical axis of the light emitted from each lamp light source 10.

The reflection mirror 41 is configured to reflect the blue component light B and guides the blue component light B to the liquid crystal panel 50B. The reflection mirror 42 and the reflection mirror 43 are configured to reflect the red component light R and guide the red component light R to the liquid crystal panel 50R.

The liquid crystal panels 50 are light valves configured to modulate the color component light beams of the respective colors. Specifically, the liquid crystal panel 50R modulates the red component light R and emits the red component light R to the dichroic prism 60. The liquid crystal panel 50G modulates the green component light G and emits the green component light G to the dichroic prism 60. The liquid crystal panel 50B modulates the blue component light B and emits the blue component light B to the dichroic prism 60.

The dichroic prism 60 is configured to combine the light beams emitted from the respective liquid crystal panels 50 and emit the combine light (image light) containing the color component light beams of the respective colors to the projection lens unit 70. The projection lens unit 70 includes a group of multiple lenses and is configured to project the combine light (the image light) onto a screen (not shown).

In the embodiment, an apparatus configured to irradiate the multiple liquid crystal panels 50 serving as irradiation objects with the light emitted from each lamp light source 10 will be referred to as an illumination apparatus 90. Specifically, the illumination apparatus 90 includes the lamp light sources 10, the fly-eye lens unit 20, and the group of the multiple mirrors and may also include an unillustrated relay lens and the like.

(Relations Among Optical Members)

A configuration of the optical element (the dichroic mirror 30) according to the embodiment will be described below with reference to the drawing. Here, the dichroic mirror 30 is disposed closer to the lamp light sources 10 than the dichroic mirror 35 is. Therefore, areas where the light beams emitted from the respective cells provided in the fly-eye lens unit 20 overlap one another on the dichroic mirror 30 are smaller than areas where the light beams emitted from the respective cells provided in the fly-eye lens unit 20 overlap one another on the dichroic mirror 35.

Figure 3:
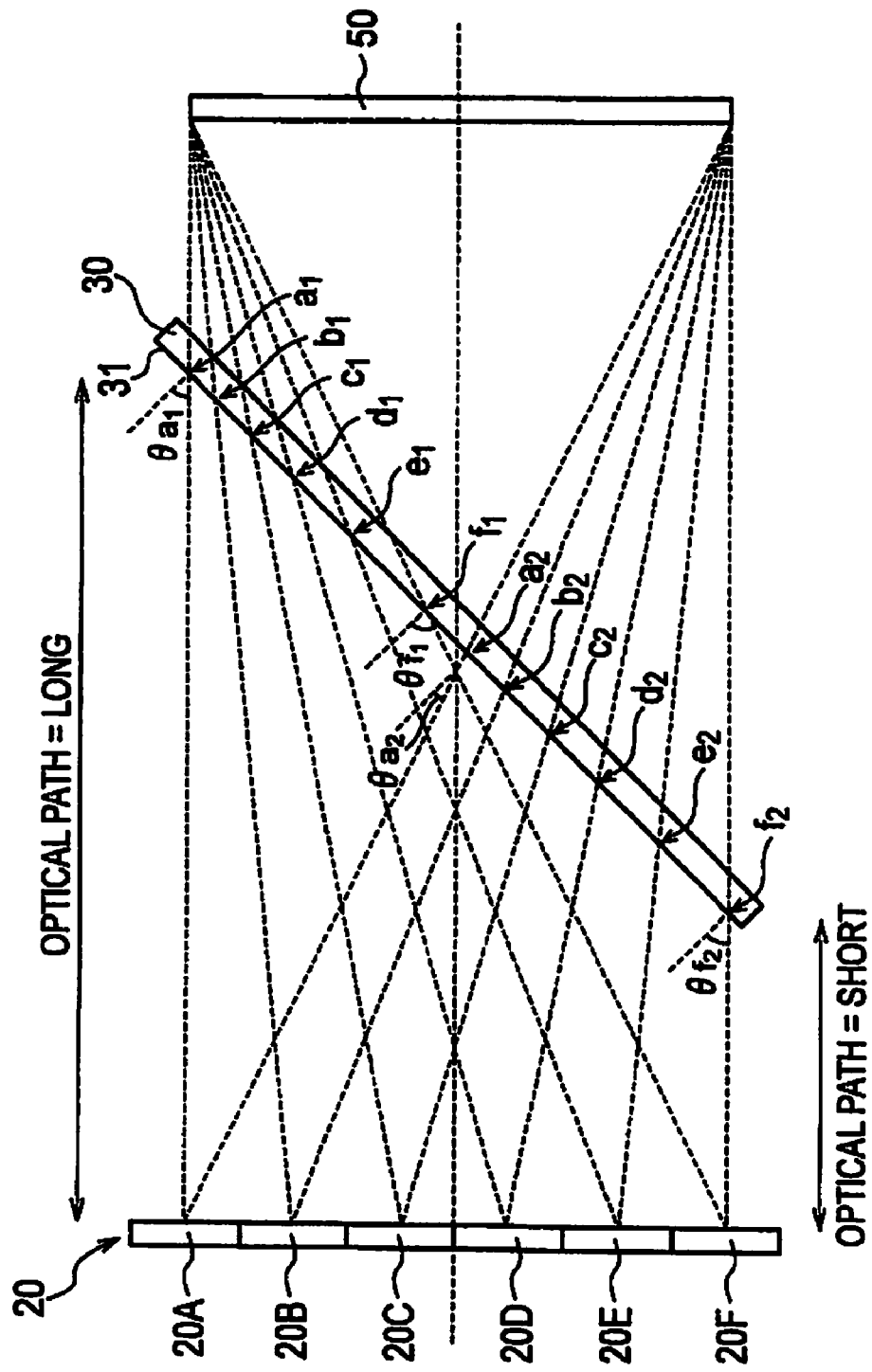
FIG. 3 is a schematic diagram showing the relations among a fly-eye lens unit 20, a dichroic mirror 30, and liquid crystal panels 50 according to the embodiment.

FIG. 3 is a schematic diagram showing the relations among the fly-eye lens unit 20, the dichroic mirror 30, and the liquid crystal panels 50 according to the embodiment. It is to be noted that the configuration of the fly-eye lens unit 20 is simplified in FIG. 3. Moreover, it is needless to say that the number of cells illustrated in FIG. 3 is merely an example and that the present invention is not limited only to this configuration.

As FIG. 3 shows, the fly-eye lens unit 20 includes multiple cells (cells 20A to 20F). The cells are formed of the microlenses provided to the pair of fly-eye lenses, respectively.

Here, the light emitted from each of the cells is applied onto the entire surfaces of the liquid crystal panels 50. That is, the light beams emitted from the cells overlap one another on the liquid crystal panels 50. In this way, the distribution of the amounts of the light beams emitted from the lamp light sources 10 is equalized on the liquid crystal panels 50.

Meanwhile, the dichroic mirror 30 is disposed between the fly-eye lens unit 20 and the liquid crystal panels 50 on the optical path of the light emitted from the lamp light sources 10. Therefore, the distribution of the amounts of the light beams emitted from the lamp light sources 10 is not equalized on the mirror surface 31 of the dichroic mirror 30.

(Incident Angle of Incident Light)

Subsequently, the incident angle of the light incident on the mirror surface 31 of the dichroic mirror 30 will be described with reference to FIG. 3. Here, the incident angles of the light beams emitted from the respective cells of the fly-eye lens unit 20 will be considered.

For example, light A emitted from the cell 20A is considered. An incident angle $\theta a_1$ of the light A at a position $a_1$ is about 45° in a configuration as shown in FIG. 3. The incident angle $\theta a_1$ is changed to an angle corresponding to a lens effect of a condenser lens if such a condenser lens is disposed between the fly-eye lens unit 20 and the dichroic mirror 30.

Meanwhile, an incident angle $\theta a_2$ of the light A at a position $a_2$ indicates that the light A at the position $a_2$ is incident on the mirror surface 31 at an angle close to a right angle as compared to the incident angle $\theta a_1$ of the light A at the position $a_1$. Specifically, the incident angle $\theta a_1$ of the light A at the position $a_1$ is greater than the incident angle $\theta a_2$ of the light A at the position $a_2$.

Similarly, light F emitted from the cell 20F is considered. An incident angle $\theta f_2$ of the light F at a position $f_2$ is almost 45° in the configuration as shown in FIG. 3. The incident angle $\theta f_2$ is changed to an angle corresponding to a lens effect of a condenser lens if such a condenser lens is disposed between the fly-eye lens unit 20 and the dichroic mirror 30.

Meanwhile, an incident angle $\theta f_1$ of the light F at a position $f_1$ indicates that the light F at the position $f_1$ is incident on the mirror surface 31 at an angle nearly parallel to the mirror surface 31 as compared to the incident angle $\theta f_2$ of the light F at the position $f_2$. Specifically, the incident angle $\theta f_1$ of the light F at the position $f_1$ is greater than the incident angle $\theta f_2$ of the light F at the position $f_2$.

Accordingly, the incident angles of the light beams emitted from each cell vary depending on the positions on the mirror surface 31. Specifically, for each cell, the light incident on the region including the positions $a_1$ to $f_1$ has a greater incident angle than the light incident on the region including the positions $a_2$ to $f_2$.

Specifically, the light incident on the region including the positions $a_1$ to $f_1$ has its angle equal to or greater than the angle $\theta a_1$ at the position $a_1$ which is defined as the minimum value. Meanwhile, the light incident on the region including the positions $a_2$ to $f_2$ has its angle equal to or smaller than the angle $\theta f_2$ at the position $f_2$ which is defined as the maximum value.

(Characteristics of Polarization Direction)

Subsequently, the polarization direction of the light incident on the mirror surface 31 of the dichroic mirror 30 will be described with reference to FIG. 4. Here, a case where light aligned with the s-polarization by the PBS array 21 is incident on the mirror surface 31 will be considered.

Figure 4:
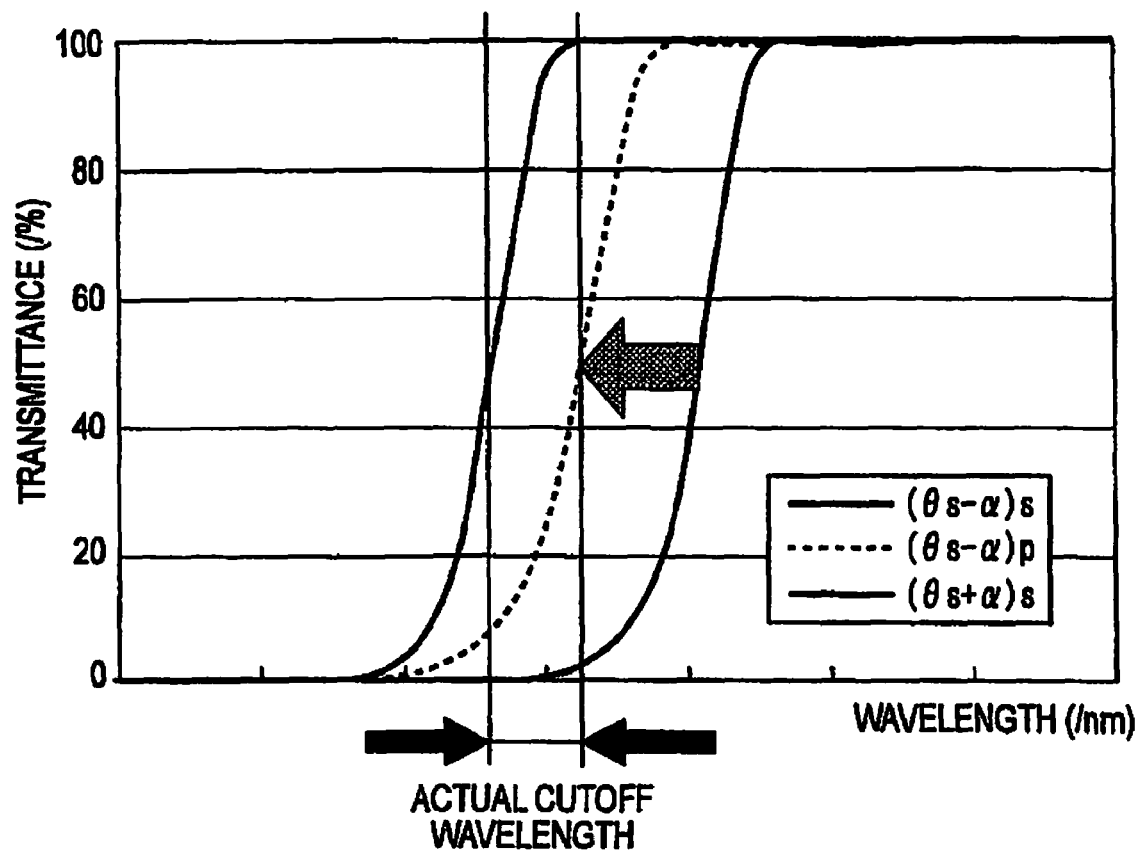
FIG. 4 is a graph for explaining an influence of a polarization direction on a cutoff wavelength according to the embodiment.

Here, a solid line on the right side in FIG. 4 (which corresponds to the dotted line in FIG. 1) represents a transmission characteristic when s-polarized light is incident on a position at an incident angle $\theta_s-\alpha$ smaller than a reference incident angle $\theta_s$ while a solid line on the left side (which corresponds to the dashed line in FIG. 1) represents a transmission characteristic when s-polarized light is incident on a position at an incident angle $\theta_s+\alpha$ greater than the reference incident angle $\theta_s$. A dotted line in the center represents a transmission characteristic when p-polarized light is incident on the position at the incident angle $\theta_s-\alpha$.

The cutoff wavelength of the dichroic mirror 30 is shifted in accordance with the polarization direction of the light incident on the mirror surface 31. Specifically, even when the incident angle on the mirror surface 31 is the same, the cutoff wavelength is shifted to a shorter wavelength side in the case of p-polarized light as compared to s-polarized light. Therefore, when the light incident on the dichroic mirror 30 is s-polarized light, the cutoff wavelength of the light having a smaller incident angle, i.e., the light incident on the region including the positions $a_2$ to $f_2$ is shifted from the position indicated with the solid line on the right side to the shorter wavelength side until the position indicated with the dotted line in the center, by converting the polarization direction of the light to the p-polarization.

On the other hand, when the light incident on the dichroic mirror 30 is p-polarized light (not shown), the cutoff wavelength of the light having a greater incident angle, i.e., the light incident on the region including the positions $a_1$ to $f_1$ is shifted from to a longer wavelength side, by converting the polarization direction of the light to the s-polarization.

In this way, it is possible to suppress variation in the actual cutoff wavelength on the entire mirror surface 31 of the dichroic mirror 30.

(Configuration of the Optical Element)

Figure 5:
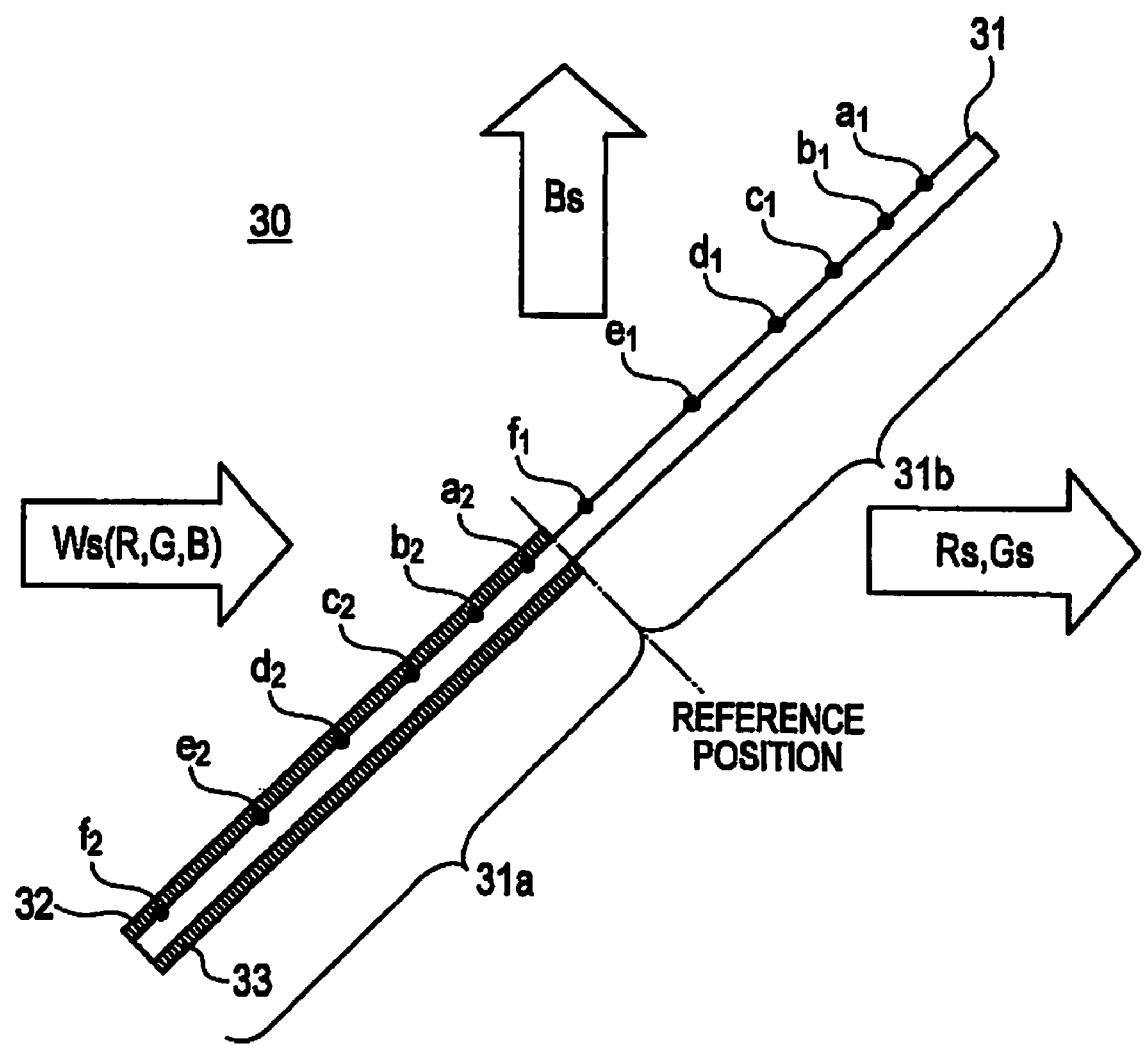
FIG. 5 is a top plan view showing a configuration of the dichroic mirror 30 according to the embodiment.
Figure 6:
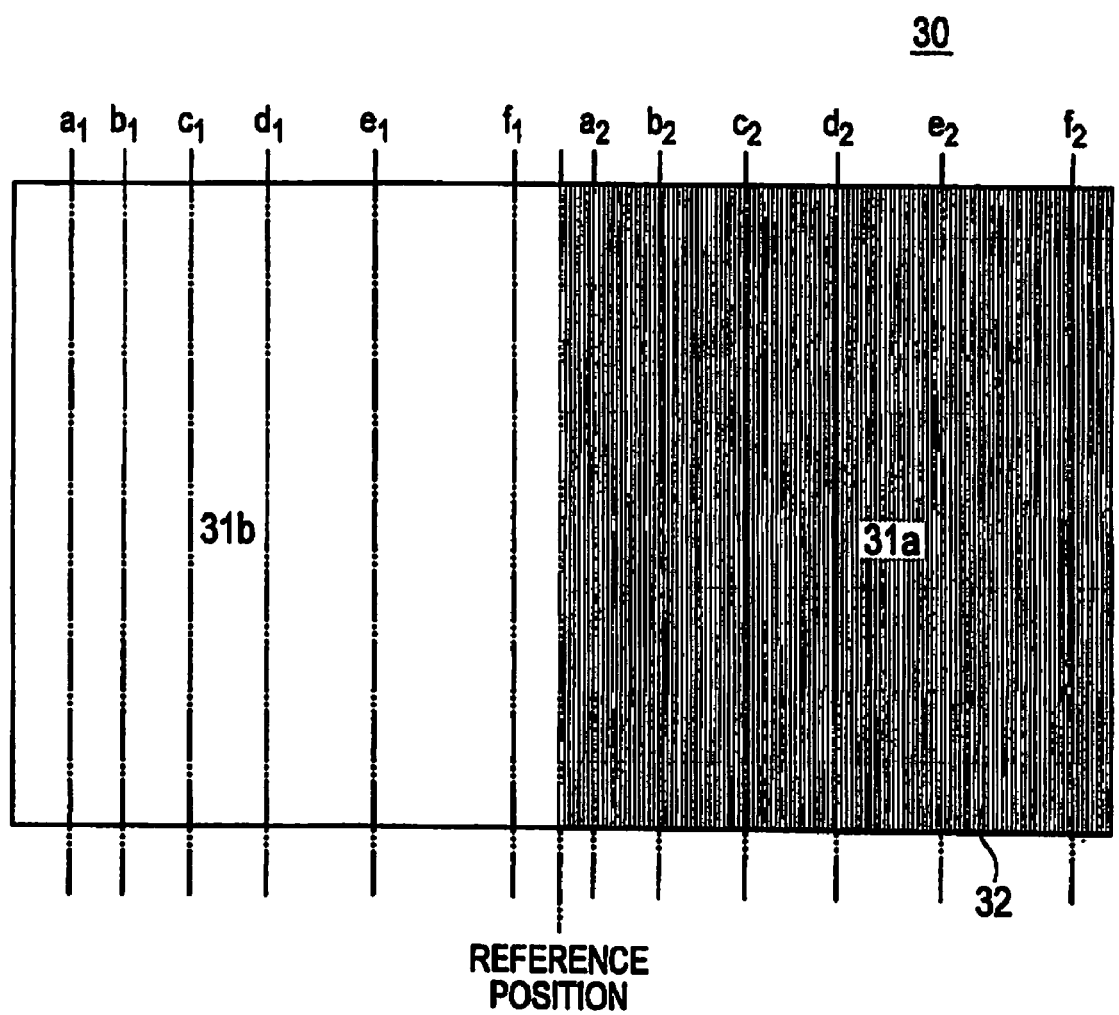
FIG. 6 is a front view showing the configuration of the dichroic mirror 30 according to the embodiment.

The configuration of the dichroic mirror according to the embodiment will be described with reference to the drawings on the basis of the characteristic of the cutoff wavelength depending on the incident angle of the light incident on the mirror surface 31 of the dichroic mirror 30 and also on the basis of the characteristic of the cutoff wavelength depending on the polarization direction of the light as described above. FIG. 5 and FIG. 6 are views showing the dichroic mirror 30 according to the embodiment. Note that FIG. 6 is a view of the dichroic mirror 30 seen from the light sources 10 side from a direction perpendicular to the mirror surface 31.

As FIG. 5 and FIG. 6 shows, the dichroic mirror 30 includes a λ/2 wavelength film 32 located on the mirror surface 31 side. Specifically, the λ/2 wavelength film 32 is provided along at least a region 31*a* on the mirror surface 31 which includes the positions $a_2$ to $f_2$, or more broadly, along the mirror surface 31 on the mirror surface 31 which extends from a reference position toward the positions $a_2$ to $f_2$.

In this way, the light having the smaller incident angle out of the light incident on the mirror surface 31 is converted into p-polarized light by the λ/2 wavelength film 32 and is made incident on the region 31*a* on the mirror surface 31. Accordingly, the cutoff wavelength in this region 31*a* is shifted to a short wavelength side as compared to the case of incidence of the original s-polarized light. The blue component light B reflected by the region 31*a* is transmitted through the λ/2 wavelength film 32 again and is therefore converted into the s-polarized light and then guided to the liquid crystal panel 50B.

Meanwhile, each of the red component light R and the green component light G transmitted through the region 31*a* is p-polarized light, and thus the polarization direction thereof would be misaligned with that of the light transmitted through a region Sib of the mirror surface 31. For this reason, λ/2 wavelength film 33 is also provided on a surface on the opposite side to the mirror surface 31 of the dichroic mirror 30. Specifically, similarly to the λ/2 wavelength film 32, the λ/2 wavelength film 33 is provided along a region extending from the reference position to the region corresponding to the positions $a_2$ to $f_2$.

Specifically, the dichroic mirror 30 should be sandwiched with the λ/2 wavelength film 32 and the λ/2 wavelength film 33 and housed in an optical component holder or the like. Alternatively, the λ/2 wavelength film 32 and the λ/2 wavelength film 33 may be attached to the dichroic mirror 30 with an adhesive or the like.

In this way, the red component light R and the green component light G transmitted through the region 31a are converted again to the s-polarized light through the λ/2 wavelength film 33 and are then guided to the liquid crystal panel 50R and the liquid crystal panel 50G, respectively.

Here, the reference position is a position where the target cutoff wavelength of the dichroic mirror 30 is set.

(Other Configuration of the Optical Element)

As described above, when the light incident on the dichroic mirror 30 is p-polarized light (not shown), the polarization direction of the light having the greater incident angle, i.e., the polarization direction of the light incident on the region including the positions $a_1$ to $f_1$ should be converted into the s-polarization.

Specifically, a λ/2 wavelength film should be attached to the region 31b on the mirror surface 30 which includes at least the positions $a_1$ to $f_1$, or more broadly, to the region 31b which is the half the mirror surface 30 on the side closer to the positions $a_1$ to $f_1$ from the reference position.

In this way, the light having the greater incident angle out of the light incident on the mirror surface 31 is converted into s-polarized light by the λ/2 wavelength film and is made incident on the region 31b. Accordingly, the cutoff wavelength in this region 31b is shifted to a long wavelength side as compared to the case of incidence of the original p-polarized light. The blue component light B reflected by the region 31b is transmitted through the λ/2 wavelength film again and is therefore converted into the p-polarized light and then guided to the liquid crystal panel 50B.

Meanwhile, each of the red component light R and the green component light G transmitted through the region 31b is s-polarized light, and thus the polarization direction thereof would be misaligned with that of the light which is transmitted through the region 31a of the mirror surface 31. For this reason, another λ/2 wavelength film is also provided on a surface on the opposite side to the mirror surface 31 of the dichroic mirror 30. Specifically, similarly to the λ/2 wavelength film 32, the other λ/2 wavelength film should be attached to a region which is the half the mirror surface 30 from the reference position and extends over the region corresponding to the positions $a_1$ to $f_1$.

In this way, the red component light R and the green component light G transmitted through the region 31b are converted into the p-polarized light again through the λ/2 wavelength film and are then guided to the liquid crystal panel 50R and the liquid crystal panel 50G, respectively.

ADVANTAGEOUS EFFECTS

According to the embodiment, the mirror surface 31 of the dichroic mirror 30 includes the region 31a where the light is incident at the smaller incident angle and the region 31b where the light is incident at the greater incident angle attributable to the lens effect of the fly-eye lens unit 20. The λ/2 wavelength film is provided on one of these regions. For example, in a case of incidence of s-polarized light, the λ/2 wavelength film to convert the s-polarization into the p-polarization is provided on the region 31a where the light having the smaller incident angle is incident. Moreover, the λ/2 wavelength film is also provided on the region where the light transmitted through the region 31a and converted into p-polarized light is emitted from the dichroic mirror 30, i.e., on the surface on the opposite side to the mirror surface 31 corresponding to the region 31a.

Thus, shifting of the cutoff wavelength to the shorter wavelength side is possible for light in a region where, in a conventional case, the cutoff wavelength would be shifted to the longer wavelength side relative to the target cutoff wavelength due to incidence of the light on the mirror surface 31 of the dichroic mirror 30 at the smaller incident angle. Therefore, it is possible to reduce variation in the cutoff wavelength on the entire mirror surface 31 of the dichroic mirror 30 and thereby to improve color purity of each color component light sufficiently.

Here, the target cutoff wavelength should be set while considering the fact in advance that reducing variation in the cutoff wavelength would shift the central value (or the average value) of the cutoff wavelength from the target cutoff value.

Although the embodiment has been described for the two-light illumination apparatus 90 and projection display apparatus 100 using the two lamp light sources 10, the present invention is not limited to such a case. A single-light type, a four-light type and the like are also conceivable. In a case of a multi-light type in which light sources are arranged in a direction corresponding to a direction to split the mirror surface 31 into several regions (the direction of arrangement of the region 31a and the region 31b), the peaks of the light amounts appear in the region 31a and in the region 31b, respectively. Thus, the present invention is effective.

Although the embodiment has been described with reference to the mirror surface 31 of the dichroic mirror 30, the present invention is not limited to such a case. The present invention is also applicable to the dichroic mirror 35.

What is claimed is:

1. An optical element comprising a mirror surface configured to transmit certain part of incident light and to reflect the other part of the incident light,
   wherein the mirror surface has a first region that has a large incident angle and a second region that has a small incident angle,
   the first region includes a first polarization conversion layer configured to convert a polarization direction of incident light incident on the first region from one linear polarization into a different linear polarization, and
   a region of the optical element from which light transmitted through the first region is emitted includes a second polarization conversion layer configured to convert a polarization direction of the light transmitted through the first region from the different linear polarization into the one linear polarization; wherein
   the first polarization conversion layer is provided at an incident side and the second polarization conversion layer is provided at an output side, in one region out of the first region and the second region.

2. An illumination apparatus comprising:
   a light source;
   a fly-eye lens configured to overlap light beams from the light source and to irradiate irradiation objects with the light beams;

a polarization conversion element configured to convert a polarization direction of each of the light beams from the light source into one linear polarization; and
an optical element having a mirror surface configured to transmit certain part of the light beams whose polarization directions are converted into the one linear polarization and to reflect the other part of the light so as to guide the certain part and the other part of the light beams to the irradiation objects, respectively,
wherein the mirror surface has a first region that has a large incident angle and a second region that has a small incident angle,
the first region includes a first polarization conversion layer configured to convert a polarization direction of incident light incident on the first region from the one linear polarization into a different linear polarization, and
a region of the optical element from which light transmitted through the first region is emitted includes a second polarization conversion layer configured to convert a polarization direction of the light transmitted through the first region from the different linear polarization into the one linear polarization: wherein
the first polarization conversion layer is provided at an incident side and the second polarization conversion layer is provided at an output side, in one region out of the first region and the second region.

3. A projection display apparatus comprising:
a light source;
a fly-eye lens configured to overlap light beams from the light source;
a polarization conversion element configured to convert a polarization direction of each of the light beams from the light source into one linear polarization; and
an optical element having a mirror surface configured to transmit certain part of the light beams whose polarization directions are converted into the one linear polarization and to reflect the other part of the light beams so as to guide the certain part and the other part of the light beams to a plurality of light valves, respectively,
wherein the mirror surface has a first region that has a large incident angle and a second region that has a small incident angle,
the first region includes a first polarization conversion layer configured to convert a polarization direction of incident light incident on the first region from the one linear polarization into a different linear polarization, and
a region of the optical element from which light transmitted through the first region is emitted includes a second polarization conversion layer configured to convert a polarization direction of the light transmitted through the first region from the different linear polarization into the one linear polarization: wherein
the first polarization conversion layer is provided at an incident side and the second polarization conversion layer is provided at an output side, in one region out of the first region and the second region.

4. A projection display apparatus comprising:
a light source;
a fly-eye lens configured to overlap light beams from the light source;
a polarization conversion element configured to convert a polarization direction of each of the light beams from the light source into one linear polarization;
light valves each configured to modulate the light beams whose polarization directions are converted into the one linear polarization;
a first optical element configured to separate light from the light source into first color component light and other color component light and to guide the first color component light to a first light valve; and
a second optical element configured to separate the other color component light into second color component light and third color component light, to guide the second color component light to a second light valve, and to guide the third color component light to a third light valve,
wherein a mirror surface of the first optical element has a first region that has a large incident angle and a second region that has a small incident angle,
the first region includes a first polarization conversion layer configured to convert a polarization direction of incident light incident on the first region from the one linear polarization into a different linear polarization, and
a region of the first optical element from which light transmitted through the first region is emitted, includes a second polarization conversion layer configured to convert a polarization direction of the light transmitted through the first region from the different linear polarization into the one linear polarization: wherein
the first polarization conversion layer is provided at an incident side and the second polarization conversion layer is provided at an output side, in one region out of the first region and the second region.

5. The projection display apparatus according to claim 3, wherein the light source includes a plurality of lamp light sources.

6. The projection display apparatus according to claim 4, wherein the light source includes a plurality of lamp light sources.

* * * * *